United States Patent
Franken et al.

(10) Patent No.: US 12,157,840 B2
(45) Date of Patent: Dec. 3, 2024

(54) PROCESS FOR THE PRODUCTION OF HOT MELT ADHESIVES HAVING A LOW EMISSION OF MONOMERIC ISOCYANATES

(71) Applicant: Henkel AG & Co. KGaA, Duesseldorf (DE)

(72) Inventors: Uwe Franken, Dormagen (DE); Hans-Georg Kinzelmann, Pulheim (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 583 days.

(21) Appl. No.: 17/377,847

(22) Filed: Jul. 16, 2021

(65) Prior Publication Data

US 2021/0340419 A1 Nov. 4, 2021

Related U.S. Application Data

(63) Continuation of application No. PCT/EP2020/050863, filed on Jan. 15, 2020.

(30) Foreign Application Priority Data

Jan. 17, 2019 (EP) ..................................... 19152326

(51) Int. Cl.
| | | |
|---|---|---|
| C09J 175/08 | (2006.01) | |
| C08G 18/12 | (2006.01) | |
| C08G 18/32 | (2006.01) | |
| C08G 18/40 | (2006.01) | |
| C08G 18/42 | (2006.01) | |
| C08G 18/48 | (2006.01) | |
| C08G 18/76 | (2006.01) | |
| C09J 5/06 | (2006.01) | |

(52) U.S. Cl.
CPC ............ *C09J 175/08* (2013.01); *C08G 18/12* (2013.01); *C08G 18/3206* (2013.01); *C08G 18/4018* (2013.01); *C08G 18/4252* (2013.01); *C08G 18/4829* (2013.01); *C08G 18/7614* (2013.01); *C08G 18/7671* (2013.01); *C09J 5/06* (2013.01); *C09J 2475/00* (2013.01)

(58) Field of Classification Search
CPC ....................................................... C09J 175/08
See application file for complete search history.

(56) References Cited

U.S. PATENT DOCUMENTS

| | | | |
|---|---|---|---|
| 3,969,301 A * | 7/1976 | Thurn ................. | C08G 18/7607 524/378 |
| 4,487,910 A | 12/1984 | Bauriedel | |
| 4,544,763 A | 10/1985 | Narayan | |
| 4,623,709 A | 11/1986 | Bauriedel | |
| 6,515,164 B1 * | 2/2003 | Bolte ................. | C08G 18/7607 528/80 |
| 6,784,242 B2 | 8/2004 | Huebener et al. | |
| 6,903,167 B2 | 6/2005 | Bolte et al. | |
| 8,653,219 B2 | 2/2014 | Becker-Weimann et al. | |
| 9,982,173 B2 | 5/2018 | Janke et al. | |
| 2003/0050423 A1 | 3/2003 | Huebener et al. | |
| 2004/0014847 A1 | 1/2004 | Bolte et al. | |
| 2004/0084138 A1 | 5/2004 | Henke et al. | |
| 2005/0020706 A1 | 1/2005 | Kollbach et al. | |
| 2016/0298009 A1 * | 10/2016 | Dey ................... | C08G 18/8019 |
| 2017/0369632 A1 | 12/2017 | Pela et al. | |
| 2018/0016385 A1 | 1/2018 | Ryu et al. | |

FOREIGN PATENT DOCUMENTS

| | | |
|---|---|---|
| CA | 2309593 A1 | 5/1999 |
| CA | 2378222 A1 | 1/2001 |
| CN | 101570676 A | 11/2009 |
| CN | 106232668 A | 12/2016 |
| EP | 0019120 A1 | 11/1980 |
| EP | 2706074 A1 | 3/2014 |
| EP | 3067377 A1 | 9/2016 |
| EP | 3315527 A1 | 5/2018 |
| JP | S60161416 A | 8/1985 |
| JP | H06271830 A | 9/1994 |
| JP | 2001522908 A | 11/2001 |
| JP | 2008285616 A | 11/2008 |
| JP | 2012062340 A | 3/2012 |
| JP | 2015151497 A | 8/2015 |
| JP | 2017519052 A | 7/2017 |
| JP | 2018514600 A | 6/2018 |
| WO | 0102458 A1 | 1/2001 |
| WO | 03051951 A1 | 6/2003 |

OTHER PUBLICATIONS

Exposure and nasal inflammation in workers heating polyurethane, edited by Littorin, M et al., Int Arch Occup Environ Health, vol. 75, No. 7, pp. 468-474, published on Sep. 30, 2002.

Talking about means to reduce VOC of polyurethane materials for automotive interior parts, edited by Lv Guohui, Chemical Propellants & Polymeric Materials, vol. 16, No. 1, pp. 1-12, published on Jan. 6, 2018.

International Search Report for International PCT Patent Application No. PCT/EP2020/050863 dated Feb. 26, 2020.

* cited by examiner

*Primary Examiner* — Michael L Leonard
(74) *Attorney, Agent, or Firm* — Sun Hee Lehmann

(57) ABSTRACT

The present invention refers to a process for the production of hot melt adhesives having a low emission of monomeric isocyanates upon heating wherein in a first step a polyurethane prepolymer is generated which is subsequently reacted with a chain extender. Further, the present invention refers to hot melt adhesives obtained by the inventive process.

19 Claims, No Drawings

PROCESS FOR THE PRODUCTION OF HOT MELT ADHESIVES HAVING A LOW EMISSION OF MONOMERIC ISOCYANATES

The present invention refers to a process for the production of hot melt adhesives having a low emission of monomeric isocyanates upon heating wherein in a first step a polyurethane prepolymer is generated which is subsequently reacted with a chain extender. Further, the present invention refers to hot melt adhesives obtained by the inventive process.

Hot melt adhesives are generally water and solvent-free formulations having a solid content of 100% based on thermoplastic polymers. They are solid at room temperature and are activated by heating above their softening point, at which stage they are liquid, and hence can be processed. After application, they retain the ability to wet the substrate until they solidify. Upon solidification, they return to a physical state that has structural integrity and can function as an adhesive. The adhesive is applied by extruding, rolling, or spraying and joining is carried out immediately after application or after reheating the solidified layer. The high viscosity of the melt makes them particularly suitable for porous and permeable substrates which otherwise would be more difficult to bond with a solvent system. A feature of hot melts is that on cooling they very rapidly build up their internal strength allowing rapid assembly and further processing.

Hot melts are used in industry for a wide range of applications. The packaging industry (manufacturing of packaging from paper, cardboard, and corrugated board) is one of the major users. Hot melts are also used in the printing industry for bonding the spines of books, in the textile industry for bonding appliqué, and in the shoe-making industry for bonding for example shoe soles. The wood processing industry uses hot melts for veneer surrounds and edging. The automotive industry employs hot melts for a host of applications including bonding insulating and cushioning materials, bonding headlight covers into metal frames and for wheel covers. The electronics industry also uses hot melts, for example for bonding coil windings and coil ends.

Hot melts based on polyurethanes are well-known and established in a wide variety of applications. They are obtained by reacting an isocyanate, usually a diisocyanate, with a polyol to obtain the solid polyurethane which is then melted before application. Although very well-established and accepted in industry, hot melt adhesive based on polyurethane suffer from the drawback that volatile organic compounds contained in the hot melt adhesive are released during processing due to the high application temperature, presenting a potential health risk to the user, in particular in large-scale industrial application and in processes wherein the molten adhesive is applied by spraying. The most critical compounds which can be released upon melting of the adhesive are residual isocyanate monomers contained in the adhesive formulation. Vapors of commonly used isocyanates such as toluene diisocyanates are known to severely irritate the eyes and respiratory tract while constant inhalation of the vapors may lead to pulmonary edema. The permissible exposure limit is extremely low since high-level exposure can result in reactive airways dysfunction syndrome. The chemical was also held responsible among others to have caused two massive explosions in a chemical warehouse in Tianjin, China.

Therefore, the need exists for polyurethane hot melt adhesive having low emission rates of monomeric isocyanates.

EP 3 067 377 discloses a prepolymer composition comprising at least one polyurethane prepolymer containing free isocyanate groups, the polyurethane prepolymer being obtained by (a) reacting at least one polyol with at least one polyisocyanate, wherein the at least one polyisocyanate is used in an amount such that the NCO groups are present in molar excess relative to the hydroxyl groups of the at least one polyol to obtain a polyurethane prepolymer containing free isocyanate groups and by (b) adding at least one compound having at least on H-acidic functional group to the polyurethane prepolymer of step (a) in an amount such that the molar ratio of the free isocyanate groups to H-acidic functional groups (NCO:XH ratio) is 2 to 15. This way an isocyanate monomer concentration of less than 0.05 wt.-% was obtained.

WO 03/051951 relates to a method for producing polyurethane prepolymers having terminal isocyanate groups during which polyisocyanates are reacted with polyols whereby the following is effected in a first synthesis step (I): a) at least one asymmetrical diisocyanate is used as the polyisocyanate; b) at least one polyol having an average molecular weight (Mn) ranging from 60 to 3000 g/mol is used as the polyol; c) the ratio of isocyanate groups to hydroxyl groups ranges from 1.2:1 to 4:1; d) a catalyst is added, and after a successful reaction, the following is effected in a second synthesis step (II): e) at least one additional polyol is added in order to obtain a total ratio of isocyanate groups to hydroxyl groups ranging from 1.1:1 to 2:1. The polyurethane prepolymers produced according to the described method are low-viscous and have a low content of monomers.

US 2004/0084138 discloses a reactive adhesive with a low monomer content and multistage hardening. The adhesive can be solvent-free or solvent containing and is a mixture of a polyurethane prepolymer (A) with a low content of monomeric isocyanate and having at least one functional group reactive with a composition containing at least one acidic hydrogen atom and at least one compound (B) containing a functional group polymerizable by irradiation. The adhesive composition can contain photoinitiators, hardeners and additives. The reactive adhesive is cured by UV radiation or electron beam radiation and by reaction of free isocyanate groups with the compositions containing at least one acidic hydrogen atom.

Although several attempts have been made to provide polyurethane hot melt adhesive with low contents of monomeric isocyanates, the problem of emission of volatile compounds upon heating has not been addressed. In particular hot melt adhesive with high application temperatures were found to still release critical amounts of monomeric isocyanates upon heating. Further, the obtained adhesives usually suffer from a reduced melt stability, in particular at temperatures above 70° C. The melt stability of a given formulation commonly refers to the thermal stability of a material at a specified temperature and shear rate and can be relied upon as an indication of how stable a material will be if it is allowed to remain in a piece of equipment at elevated temperatures for extended periods of time.

It is therefore an object of the present invention to provide a process for the production of polyurethane hot melt adhesives overcoming the drawbacks of the prior art by having a low emission of monomeric isocyanates, in particular toluene diisocyanates, when melted and also showing a good melt stability.

This object is solved by a process which involves the subsequent addition of a mixture of toluene diisocyanate and methylene diphenyldiisocyanate to a polyol, followed by chain extension reaction.

A first object of the present invention is therefore a process for the production of a hot melt adhesive comprising a polyurethane prepolymer wherein the polyurethane prepolymer is reacted with a chain extender characterized in that the polyurethane prepolymer is obtained by a reaction wherein in a first step (i) 2,4'-toluene diisocyanate (2,4'-TDI) is reacted with a polyol and in a subsequent step
(ii) methylene diphenyldiisocyanate (MDI) is added to the reaction mixture of step (i);

wherein the hot melt adhesive has an application temperature of 80 to 160° C., preferably 90 to 140° C.

It was surprisingly found that subsequent addition of the isocyanate compounds used resulted in a hot melt adhesive which had a low content of monomeric isocyanates but also only very low or not-measurable emission of either diisocyanate upon melting while at the same time showing a good melt stability.

In a preferred embodiment the chain extender further reacted with the prepolymer is selected from the group consisting of 1,3-butane diol, 1,2-propane diol, 2-ethyl-1-hexanol, diethylene glycol, tripropylene glycol, isosorbide, resorcinol, 1,4-dimethylol cyclohexane, and mixture thereof. It was surprisingly found that by using low molecular weight diols and monols the content of monomeric isocyanates in the hot melt adhesive could be reduced while at the same time maintaining the melt stability of the adhesive, in particular at temperatures above 70° C.

The reactions of step (i) and (ii) of the inventive process may be conducted in the presence of a catalyst in order to enhance the turn-over rate of the reaction as well as reduce the reaction time and temperature. In a preferred embodiment, step (i) and/or step (ii) of the inventive process are therefore conducted in the presence of a catalyst. The catalyst is preferably chosen from the group consisting of metal organic compounds and amine-containing organic compounds. In an especially preferred embodiment, the catalyst is selected from the group consisting of metal organic compounds derived from tin, iron, titanium, bismuth and zirconium. In an alternatively preferred embodiment, the catalyst is c-caprolactam.

The polyol employed in step (i) of the inventive process is preferably a polyol having an average number molecular weight $M_n$ of 100 to 10000 g/mol, preferably 500 to 5000 g/mol, determined by GPC. The chain extender can in particular be chosen to control the viscosity properties of the polyurethane prepolymer. In an especially preferred embodiment, polyetherpolyols and/or polyesterpolyols are employed as chain extenders.

In a further preferred embodiment, the polyol has a hydroxyl value (OH value) of 50 to 1500 mg KOH/g, preferable 250 to 1500 mg KOH/g, most preferable 500 to 1500 mg KOH/g. The hydroxyl value is a measure of the content of free hydroxyl groups in a chemical substance, usually expressed in units of the mass of potassium hydroxide (KOH) in milligrams equivalent to the hydroxyl content of one gram of the chemical substance. The analytical method used to determine the hydroxyl value traditionally involves acetylation of the free hydroxyl groups of the substance with acetic anhydride in pyridine solvent. The hydroxyl value can be determined according to ASTM E222-10.

Although one obvious approach to reduce the content of monomeric isocyanates in the hot melt adhesive would be to use a low amount to begin with, it was found to be advantageous with regard to large-scale productions to employ a molar excess of the isocyanate component with respect to the hydroxyl-component in step (ii). While in step (i), the hydroxyl-component is molar excess to the isocyanate component. In a preferred embodiment, the molar ratio of isocyanate groups to hydroxyl groups (NCO:OH) in step (i) and/or step (ii) of the inventive process is therefore 1.1:1 to 4:1, preferably 1.5:1 to 3:1. Although the isocyanate groups are present in a molar excess in the step (ii), it was nevertheless possible to obtain a hot melt adhesive with a very low content of monomeric toluene diisocyanate and methylene diphenyldiisocyanate which also showed very low to not-measurable emission of either compound upon heating.

It was surprisingly found that the content of monomeric toluene diisocyanate in the hot melt adhesive could be reduced to less than 0.02 wt.-% when the hot melt adhesive was produced according to the inventive process. In a preferred embodiment, the hot melt adhesive therefore has a content of monomeric toluene diisocyanate of less than 0.02 wt.-%, preferably less than 0.01 wt.-%, based on the total weight of the hot melt adhesive.

Since toluene diisocyanate is not the only critical isocyanate contained in the hot melt adhesive, it is desirable to reduce the content of all monomeric isocyanates in the hot melt adhesive since they were found to be a potential health risk which also limits the application of such adhesives, especially with regard to their employment in the production of food packaging. Therefore, an embodiment of the present invention is preferred wherein the monomeric content of methylene diisocyanate in the hot melt adhesive is less than 0.1 wt.-%, preferably less than 0.05 wt.-%, based on the total weight of the hot melt adhesive.

It was surprisingly found that the inventive process is in particular suitable for the production of hot melts having a wide range of softening points. In a preferred embodiment of the inventive process, the hot melt adhesive has therefore a softening point of more than 40° C., preferably more than 50° C., determined according to the method of ring & ball.

The inventive process is especially suitable for the production of hot melt adhesives having low contents of monomeric isocyanates. A further object of the present invention is therefore a hot melt adhesive obtained by the inventive process, the obtained hot melt adhesive having a content of monomeric toluene diisocyanate of less than 0.02 wt.-%, preferably less than 0.01 wt.-%, based on the total weight of the hot melt adhesive.

In a preferred embodiment, the monomeric content of methylene diisocyanate in the inventive hot melt adhesive is less than 0.1 wt.-%, preferably less than 0.05 wt.-%, based on the total weight of the hot melt adhesive.

It was surprisingly found that the inventive hot melt adhesive showed a good melt stability in combination with low amounts of monomeric isocyanates. A poor melt stability usually results in an increase in viscosity if the hot melt is kept at application over a longer period of time. The inventive hot melt adhesive therefore shows a viscosity increase while being kept at application temperature for a period of 2 hours of no more than 20%, determined according to ASTM D3835.

Although common polyurethane hot melt adhesive may show a low content of monomeric isocyanates, there is always the risk of emission of volatile contents such as toluene diisocyanate due to the high application temperatures of hot melt adhesives. It was surprisingly found that in most cases, the emission of toluene diisocyanate upon melting of the inventive hot melt adhesive was below the level of detection. In a preferred embodiment, the inventive hot melt adhesive therefore has an emission rate of toluene diisocyanate of less than 2 ppb, preferably less than 1 ppb, in particular less than 0.5 ppb, the ppb referring to parts by weight of the hot melt adhesive. The emission rate was measured at 130° C. over a period of at least 30 minutes.

The present invention will be explained in more detail by the following examples which by no means are to be understood as limiting the scope or spirit of the invention.

EXAMPLES

Prepolymer

The prepolymer was obtained by mixing polypropylene glycol (487.5 g, hydroxyl number 237 mg KOH/g) and a polyester of adipic acid, isophthalic acid/PPG/diethylene glycol (56.2 g, hydroxyl number 137 mg KOH/g) with 2,4'-TDI (269 g). An NCO value of 6.8% was obtained after heating to ca. 80° C. 4,4'-MDI (57.5 g) was subsequently added and stirring was continued at 80° C. An NCO end value of ca. 6.41% was obtained.
The following conditions were observed:
NCO:OH (step (i))=1.38:1
NCO:OH (step (ii))=2.2:1

The content of monomeric TDI was determined to be 0.04 wt.-% and the monomeric content of MDI was found to be 0.8 wt.-%. The total NCO-content of the prepolymer was determined to be 6.41%. The prepolymer showed a viscosity of 77 500 mPa*s, determined at 50° C.

Example 1

450 g of the prepolymer were heated up to 80° C. and 7.12 g of 1,3-butanediol as were added.

The amount of 1,3-butanediol was calculated so that 20% of the total NCO groups of the prepolymer were converted.

The content of monomeric TDI in the final product was found to be less than 0.01 wt.-%. The content of monomeric MDI in the final product was to be 0.09 wt.-%. The total NCO-content was determined to be 4.47%.

The resulting product showed a viscosity of 33 000 mPa*s at 100° C. After 2 hours at 100° C. the viscosity reached 38 500 mPa*s, corresponding to an increase in viscosity of 16.6%.

Example 2

450 g of the prepolymer were heated up to 80° C. and 8.67 g of 1,2-propane diol were added.

The amount of 1,2-propane diol was calculated so that 20% of the total NCO groups in the prepolymer were converted.

The content of monomeric TDI in the final product was found to be less than 0.01 wt.-%. The content of monomeric MDI in the final product was to be 0.08 wt.-%. The total NCO-content was determined to be 4.03%.

The resulting product showed a viscosity of 50 500 mPa*s at 100° C. After 2 hours at 100° C. the viscosity reached 58 100 mPa*s, corresponding to an increase in viscosity of 15.1%.

Example 3 (One Pot Approach)

Calculation of necessary amounts of TDI and MDI were done as described above for the prepolymer preparation.

Polypropylene glycol (487.5 g, hydroxyl number 237 mg KOH/g) and a polyester of adipic acid, isophthalic acid/ PPG/diethylene glycol (56.2 g, hydroxyl number 137 mg KOH/g) were mixed and heated up to ca. 80° C. The calculated amount of 2,4'-TDI (269 g) and 4,4'-MDI (57.5 g) were added at 80° C. and homogenate for 10 min at 80° C.

13.77 g of 1,3-butanediol were added and the mixture was reacted at 80° C. for 120 min.

The content of monomeric TDI in the final product was found to be less than 0.02 wt.-%. The content of monomeric MDI in the final product was to be 0.08 wt.-%. The total NCO-content was determined to be 4.39%.

The resulting product showed a viscosity of 41 000 mPa*s at 100° C. After 2 hours at 100° C. the viscosity reached 48 350 mPa*s, corresponding to an increase in viscosity of 18%.

Films having a thickness of 100 μm were prepared using a hot melt adhesive of examples 1 to 3, produced according to the claimed process. The film was outgassed at 130° C. for 2 hours by placing the film on a hot plate and the emission concentration of toluene diisocyanate (TDI) and methylene diphenyldiisocyanate (MDI) were measured at head height (30 cm) above the hot plate and 15 cm above the hot plate, respectively. The results are summarized in Table 1:

TABLE 1

|  | Distance 30 cm | Distance 15 cm |
| --- | --- | --- |
| TDI | 0.0035 mg/m$^3$ | 0.0169 mg/m$^3$ |
| MDI | <0.0035 mg/m$^3$ | 0.0042 mg/m$^3$ |

In all cases, the official threshold of 0.035 mg/m$^3$ for TDI and 0.05 mg/m$^3$ for MDI, respectively, was not reached. The inventive hot melt adhesive showed a low emission rate below the threshold for TDI and MDI while at the same time having a low content of the respective monomeric isocyanates and maintaining a good melt stability.

The invention claimed is:

1. A process for production of a melt stable hot melt adhesive, the process comprising:
   forming a polyurethane prepolymer by a process comprising:
   (i) forming a reaction mixture by reacting 2,4'-toluene diisocyanate (2,4'-TDI) with a polyol; and
   (ii) reacting methylene diphenyl diisocyanate (MDI) with the reaction mixture of step (i); and
   reacting the polyurethane prepolymer with a chain extender to form a melt stable hot melt adhesive,
   wherein the chain extender is selected from the group consisting of 1,3-butane diol, 1,2-propane diol, 2-ethyl-1-hexanol, diethylene glycol, tripropylene glycol, isosorbide, resorcinol, 1,4-dimethylol cyclohexane, and mixtures thereof,
   wherein the melt stable hot melt adhesive has an application temperature of from 80 to 160° C., and
   wherein the melt stable hot melt adhesive shows no more than a 20% increase in viscosity while being kept at the application temperature for a period of 2 hours.

2. The process of claim 1, wherein step (i) and step (ii) are conducted in the presence of a catalyst selected from the group consisting of metal organic compounds and amine-containing organic compounds.

3. The process of claim 1, wherein the polyol has an average number molecular weight (Mn) of from 100 to 10000 g/mol, determined by GPC.

4. The process of claim 1 wherein the polyol comprises a polyetherpolyol, a polyesterpolyol, or a combination thereof.

5. The process of claim 1, wherein the polyol has a hydroxyl value of from 50 to 1500 mg KOH/g.

6. The process of claim 1, wherein the ratio of isocyanate groups to hydroxyl groups (NCO:OH) in step (i) and/or step (ii) is from 1.1:1 to 4:1.

7. The process of claim 1, wherein the melt stable hot melt adhesive contains less than 0.02 wt.-% of monomeric toluene diisocyanate, based on the total weight of the melt stable hot melt adhesive.

8. The process of claim 1, wherein the melt stable hot melt adhesive contains less than 0.1 wt.-% of monomeric methylene diphenyl diisocyanate, based on the total weight of the melt stable hot melt adhesive.

9. The process of claim 1, wherein the melt stable hot melt adhesive has a softening point of more than 40° C., determined according to the method of ring & ball.

10. A melt stable hot melt adhesive obtained by the process of claim 1, wherein the melt stable hot melt adhesive contains less than 0.02 wt.-% of monomeric toluene diisocyanate, based on the total weight of the hot melt adhesive.

11. The melt stable hot melt adhesive of claim 10, wherein melt stable hot melt adhesive contains less than 0.1 wt.-% of monomeric methylene diphenyl diisocyanate, based on the total weight of the hot melt adhesive.

12. The melt stable hot melt adhesive of claim 10, wherein the melt stable hot melt adhesive exhibits a toluene diisocyanate emission rate of less than 2 ppb over a 30 minute period at 130° C.

13. A melt stable hot melt adhesive comprising a chain extended polyurethane prepolymer, wherein:
the chain extended polyurethane prepolymer is a reaction product of a polyurethane prepolymer and a chain extender,
the polyurethane prepolymer is a reaction product of 2,4'-toluene diisocyanate (2,4'-TDI), a polyol and methylene diphenyl diisocyanate (MDI),
the chain extender is selected from the group consisting of 1,3-butane diol, 1,2-propane diol, 2-ethyl-1-hexanol, diethylene glycol, tripropylene glycol, isosorbide, resorcinol, 1,4-dimethylol cyclohexane, and mixtures thereof;
the melt stable hot melt adhesive has an application temperature of from 80 to 160° C., and the melt stable hot melt adhesive shows no more than a 20% increase in viscosity while being kept at the application temperature for a period of 2 hours,
the melt stable hot melt adhesive contains less than 0.02 wt.-% of monomeric toluene diisocyanate, based on the total weight of the melt stable hot melt adhesive; and
the melt stable hot melt adhesive contains less than 0.1 wt.-% of monomeric methylene diphenyl diisocyanate, based on the total weight of the melt stable hot melt adhesive.

14. The melt stable hot melt adhesive of claim 13, wherein the polyurethane prepolymer is prepared by a process comprising:
(i) reacting the 2,4'-toluene diisocyanate (2,4'-TDI) and the polyol in a first step to form an intermediate; and
(ii) reacting the intermediate with methylene diphenyl diisocyanate (MDI) to form the polyurethane prepolymer.

15. The melt stable hot melt adhesive of claim 13, wherein the polyurethane prepolymer is prepared by a process comprising:
(i) reacting a molar excess of 2,4'-toluene diisocyanate (2,4'-TDI) and the polyol in a first step to form an intermediate; and
(ii) reacting the intermediate with a molar excess of methylene diphenyl diisocyanate (MDI) to form the polyurethane prepolymer.

16. The melt stable hot melt adhesive of claim 13, wherein the polyurethane prepolymer is prepared by a process comprising:
(i) reacting 2,4'-toluene diisocyanate (2,4'-TDI) and a molar excess of the polyol in a first step to form an intermediate; and
(ii) reacting the intermediate with a molar excess of methylene diphenyl diisocyanate (MDI) to form the polyurethane prepolymer.

17. The melt stable hot melt adhesive according to of claim 13, wherein the chain extended polyurethane prepolymer comprises NCO moieties.

18. The melt stable hot melt adhesive of claim 13, wherein the melt stable hot melt adhesive exhibits a toluene diisocyanate emission rate of less than 2 ppb over a 30 minute period at 130° C.

19. The melt stable hot melt adhesive according to claim 13, wherein the application temperature is from 90 to 140° C.

* * * * *